(12) United States Patent
Yamkovoy

(10) Patent No.: US 9,215,529 B2
(45) Date of Patent: Dec. 15, 2015

(54) MULTI-MODE AUDIO DEVICE INTERFACING

(75) Inventor: Paul G. Yamkovoy, Acton, MA (US)

(73) Assignee: Bose Corporation, Framingham, MA (US)

( * ) Notice: Subject to any disclaimer, the term of this patent is extended or adjusted under 35 U.S.C. 154(b) by 1282 days.

(21) Appl. No.: 13/081,010

(22) Filed: Apr. 6, 2011

(65) Prior Publication Data

US 2012/0014530 A1 Jan. 19, 2012

Related U.S. Application Data

(63) Continuation-in-part of application No. 12/838,465, filed on Jul. 18, 2010, now Pat. No. 8,494,185, and a continuation-in-part of application No. 12/838,464, filed on Jul. 18, 2010, now Pat. No. 8,494,184.

(60) Provisional application No. 61/387,282, filed on Sep. 28, 2010.

(51) Int. Cl.
*H04R 29/00* (2006.01)
*H04R 5/04* (2006.01)
*H04M 1/60* (2006.01)
*H04R 1/10* (2006.01)
*H04R 3/12* (2006.01)
*H04R 5/033* (2006.01)

(52) U.S. Cl.
CPC ............... *H04R 5/04* (2013.01); *H04M 1/6066* (2013.01); *H04R 29/001* (2013.01); *H04R 29/004* (2013.01); *H04R 1/1025* (2013.01); *H04R 1/1041* (2013.01); *H04R 3/12* (2013.01); *H04R 5/033* (2013.01); *H04R 29/007* (2013.01); *H04R 2201/028* (2013.01); *H04R 2227/003* (2013.01); *H04R 2420/03* (2013.01); *H04R 2420/07* (2013.01); *H04R 2420/09* (2013.01); *H04R 2499/11* (2013.01)

(58) Field of Classification Search
CPC ..... H04M 1/6066; H04R 5/04; H04R 29/001; H04R 29/004; H04R 2499/11; H04R 1/1041; H04R 3/12; H04R 5/033; H04R 29/007; H04R 2227/003; H04R 2420/03; H04R 2420/07; H04R 2420/09; H04R 1/1025
USPC ............. 381/58, 59, 120, 119, 150, 400, 306, 381/111, 370, 375, 374, 182, 74; 379/430, 379/428.01; 455/575.2; 330/11, 138, 135, 330/127, 129; 365/189.2, 189.011
See application file for complete search history.

(56) References Cited

U.S. PATENT DOCUMENTS 8,412,268 B2 * 4/2013 Inha et al. ..................... 455/557
8,432,068 B2 * 4/2013 Yamkovoy .................... 307/134

(Continued)

OTHER PUBLICATIONS

Extended European Search Report dated Aug. 8, 2013 for Application No. 13173225.7-1901.

*Primary Examiner* — Vivian Chin
*Assistant Examiner* — Con P Tran

(57) ABSTRACT

A headset having a connector compliant with a specification for a first digital serial bus incorporates a separator circuit that monitors the voltage level of one conductor of that connector to distinguish between a first digital interfacing mode in which the conductors of that connector are operated in a manner supporting the first digital serial bus and a second digital interfacing mode in which the conductors of that connector are operated in a manner in supporting a second digital serial bus, and further, the monitoring of the voltage level of the one conductor may also be employed to distinguish between both the first and second digital interfacing mode and either a third digital interfacing mode or an analog interfacing mode.

4 Claims, 5 Drawing Sheets

(56) References Cited

U.S. PATENT DOCUMENTS

| | | | |
|---|---|---|---|
| 2004/0157555 A1* | 8/2004 | Richenstein et al. | 455/39 |
| 2006/0147062 A1* | 7/2006 | Niwa et al. | 381/113 |
| 2011/0013780 A1* | 1/2011 | Yamkovoy | 381/58 |
| 2011/0110536 A1* | 5/2011 | Hovesten et al. | 381/111 |

* cited by examiner

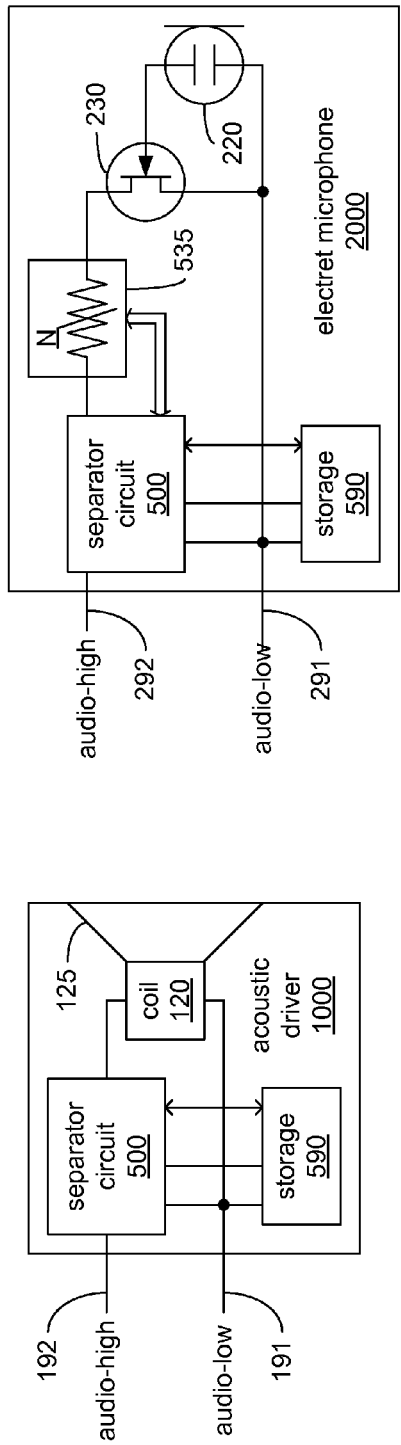
FIG. 1b
FIG. 1a
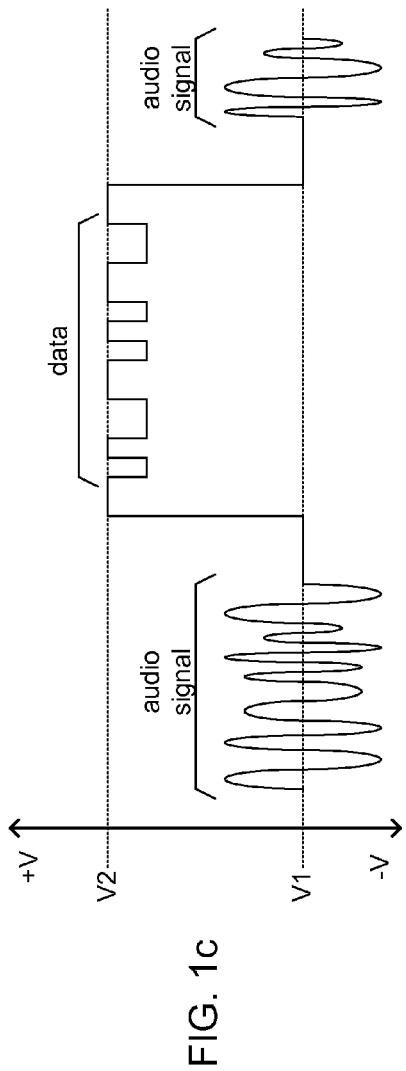
FIG. 1c

MULTI-MODE AUDIO DEVICE INTERFACING

CROSS-REFERENCE TO RELATED APPLICATIONS

This application claims the benefit of U.S. Provisional Application Ser. No. 61/387,282 entitled ELECTRO-ACOUSTIC TRANSDUCER TUNING AND DATA STORAGE filed Sep. 28, 2010 by Vasu Iyengar, Richard L. Pyatt, Steven H. Isabelle, Michael D'Agostino and Paul G. Yamkovoy, the disclosure of which is incorporated herein by reference.

The present application is a continuation-in-part of application Ser. No. 12/838,465 filed Jul. 18, 2010 by Paul G. Yamkovoy, now U.S. Pat. No. 8,494,185, and is a continuation-in-part of application Ser. No. 12/838,464 filed Jul. 18, 2010 by Paul G. Yamkovoy, now U.S. Pat. No. 8,494,184, the disclosures of which are incorporated herein by reference.

TECHNICAL FIELD

This disclosure relates to audio devices having electro-acoustic transducers (e.g., microphones and acoustic drivers) and that are able to be coupled to other devices through conductors able to engage in digital serial communications in at least one digital interfacing mode.

BACKGROUND

Small and portable audio devices continue to grow in complexity and are subject to growing expectations concerning the fidelity with which they record (i.e., detect) and play (i.e., acoustically output) sounds. As a result, there is a growing use of digital processing technologies in such audio devices that enable the provision of finer degrees of adjustment to compensate for variances in manufacturing of acoustic components, enable many features to be altered via programming, and enable considerable flexibility in testing.

However, making use of these benefits has been frustrated with the need to be able to couple such audio devices to another device by which such adjustments can be made, such programming can be carried out and/or such testing can be conducted. One well known approach to enabling such coupling is the provision of test points formed on a circuitboard of such an audio device. Unfortunately, the provision of test points requires the loss of valuable space on such circuitboards to position those test points at locations accessible to technicians, and frequently, any use of such test is only possible with such audio devices being at least partially disassembled to gain access to them. Another well known approach to enabling such coupling is the provision of an additional connector. While this may easily enable coupling without disassembly of such an audio device, the connector itself, as well as other accommodations made for its inclusion, often adds both cost and weight to such audio devices.

SUMMARY

A headset having a connector compliant with a specification for a first digital serial bus incorporates a separator circuit that monitors the voltage level of one conductor of that connector to distinguish between a first digital interfacing mode in which the conductors of that connector are operated in a manner supporting the first digital serial bus and a second digital interfacing mode in which the conductors of that connector are operated in a manner in supporting a second digital serial bus, and further, the monitoring of the voltage level of the one conductor may also be employed to distinguish between both the first and second digital interfacing mode and either a third digital interfacing mode or an analog interfacing mode.

In one aspect, an apparatus includes an acoustic driver; an interface circuit, a storage, a connector and a plurality of audio signal conductors to enable coupling of the apparatus to a device, and a separator circuit coupled to the two audio signal conductors and to the audio circuit. The separator circuit is structured to monitor a voltage placed across the two audio signal conductors of the plurality of audio signal conductors by the device to distinguish between operation of the plurality of audio signal conductors in a first digital interfacing mode and a second digital interfacing mode by the device, enable access to the interface circuit by the device in response to operation of the plurality of audio conductors in the first digital interfacing mode to allow an exchange of data representing audio to be acoustically output by the acoustic driver, and enable access to the storage by the device in response to operation of the plurality of audio conductors in the second digital interfacing mode to allow the device to retrieve data stored within the storage.

In one aspect a method includes monitoring a voltage placed across two audio signal conductors of a plurality of audio signal conductors of a connector of an apparatus that enables a device to be coupled to the apparatus through the plurality of audio signal conductors to distinguish between operation of the plurality of audio signal conductors in a first digital interfacing mode and a second digital interfacing mode by the device; enabling access to an interface circuit of the apparatus by the device in response to operation of the plurality of audio conductors in the first digital interfacing mode to allow an exchange of data representing audio to be acoustically output by an acoustic driver of the apparatus; and enabling access to a storage of the apparatus by the device in response to operation of the plurality of audio conductors in the second digital interfacing mode to allow the device to retrieve data stored within the storage.

Other features and advantages of the invention will be apparent from the description and claims that follow.

DESCRIPTION OF THE DRAWINGS

FIG. 1a is a block diagram of an acoustic driver having a storage for data transferred via its audio signal conductors.

FIG. 1b is a block diagram of an electret microphone having a storage for data transferred via its audio signal conductors and/or an amplifier tunable with data transferred via its audio signal conductors.

FIG. 1c is a signal diagram depicting differing DC voltage levels at which analog audio signals and digitally-encoded data are transferred via the audio signal conductors of either the acoustic driver of FIG. 1a or the electret microphone of FIG. 1b.

DETAILED DESCRIPTION

Figure 2B:
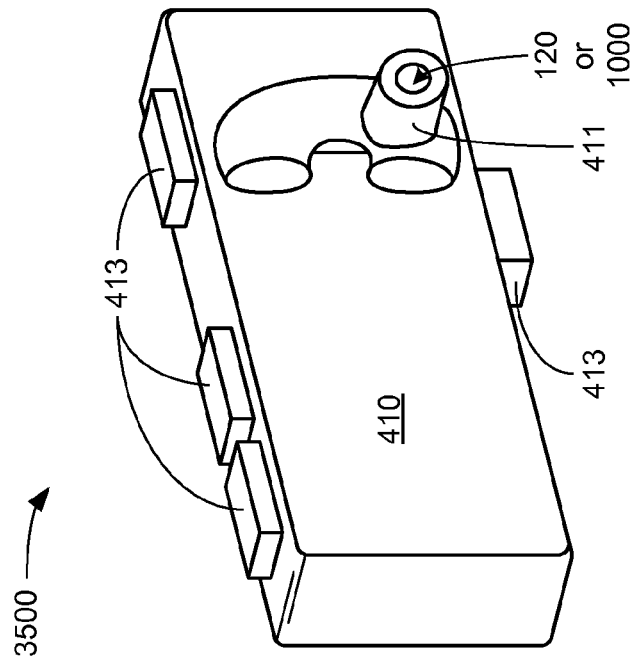
FIGS. 2a and 2b are perspective views from different angles of a wireless two-way communications headset.

What is disclosed and what is claimed herein is intended to be applicable to a wide variety of audio devices employing audio signal conductors to exchange signals representing audio and/or data of use in detecting, acoustically outputting and/or transceiving audio, especially audio devices incorporating electro-acoustic transducers. This includes audio devices carried or worn by a person such as headphones, active noise reduction (ANR) headsets, two-way communications headsets (e.g., pilot headsets), wireless headsets (a.k.a., "earsets"), earphones (a.k.a., "earbuds"), clip-on microphones, walkie-talkies and cell phones, as well as the relatively small electro-acoustic transducers often incorporated into such devices (e.g., discrete dynamic or electret microphone elements, etc.). This also includes audio devices that are incorporated in vehicles or other larger pieces of machinery, such as intercom systems and vehicle radios. Still further, this also includes audio devices that are more stationary in nature such that they are normally meant to occupy a particular location within a room or other space, such as boxed speakers, self-amplified speakers, surround sound satellite speakers, center channel speakers, subwoofers, speakers incorporating multiple acoustic drivers controlled through a crossover, electrostatic speakers, suspended or podium microphones, professional recording microphones, camera microphones, as well as the relatively larger electro-acoustic transducers often incorporated into such devices (e.g., tweeters, woofers, mid-range acoustic drivers, Mylar film acoustic drivers, etc.).

FIG. 1a is a block diagram of an acoustic driver 1000, FIG. 1b, is a block diagram of an electret microphone 2000, and FIG. 1c is a diagram of voltage activity across audio signal conductors employed in exchanging audio signals with either of the acoustic driver 1000 or the electret microphone 2000. As will be explained in greater detail, FIG. 1c depicts alternating use of the audio conductors in an analog interfacing mode in which analog signals convey audio and a digital interfacing mode in which digital signals forming a digital serial bus convey audio-related data (e.g., audio-related settings and/or digitally-encoded audio), and FIG. 1c depicts the use of different direct current (DC) voltage potentials to distinguish between these two modes.

The acoustic driver 1000 is a form of electro-acoustic transducer. In the case of the acoustic driver 1000, the transduction that takes places is a conversion of electrical energy in the form of analog signals representing a sound received by the acoustic driver 1000 via an audio-low conductor 191 and an audio-high conductor 192 (i.e., via a pair of audio signal conductors) being converted into acoustic energy in the form of the acoustic output of the sound through a coil 120 and a diaphragm 125. The acoustic driver 1000 incorporates the coil 120, the diaphragm 125, the audio-low conductor 191, the audio-high conductor 192, a separator circuit 500 and a storage 590. The audio-low conductor is coupled to each of the coil 120, the separator circuit 500 and the storage 590. The audio-high conductor 192 is coupled to the separator circuit 500, and in turn, the separator circuit 500 is AC-coupled to the coil 120 and the storage 590.

During normal operation of the acoustic driver 1000 in its intended role of acoustically outputting sounds, the acoustic driver 1000 is coupled via the audio-low conductor 191 and the audio-high conductor 192 to a source device (not shown) or to other components of a device into which the acoustic driver is also incorporated (also not shown), and the acoustic driver 1000 is provided with an analog signal representing sounds via these two audio signal conductors (i.e., these conductors are used in an analog interfacing mode). As will be familiar to those skilled in the art, the audio-low conductor 191 and the audio-high conductor 192 are used together as a pair of audio signal conductors to convey such analog signals, with one serving as a return current path for the other. Such analog audio signals may include a relatively low DC bias voltage (depicted as V1 in FIG. 1c), however, the operation of the acoustic driver 1000 to acoustically output sound requires an AC signal (or AC component of a signal) that is generally within the range of 20 Hz to 20 KHz (i.e., generally within the range of frequencies of human hearing).

The electret microphone 2000 is another form of electro-acoustic transducer. In the case of the electret microphone 2000, the transduction that takes places is a conversion of acoustic energy in the form of a sound vibrating a conductive diaphragm spaced away from a conductive plate (these two conductive components being within an electret element 200 depicted in FIG. 2a) resulting in a changing capacitance that is converted by an amplifying device of the electret microphone (in this case, a JFET 230, as depicted in FIG. 2a) into electrical energy in the form of analog signals representing the sound vibrating the conductive diaphragm (more succinctly, a conversion from acoustic energy to electrical energy). In other words, the sound is, in this way, detected by the electret element 200, and the JFET 230 creates these analog audio signals representing the sound. These analog signals representing the detected sound are output by the electret microphone 2000 via a audio-low conductor 291 and a audio-high conductor 292 (i.e., via a pair of audio signal conductors of the electret microphone 2000). The electret microphone 2000 incorporates an electret element 220 made up of the conductive diaphragm and conductive plate, the JFET 230, a separator circuit 500, and one or both of a digital potentiometer 535 and a storage 590. The audio-low conductor 291 is coupled to each of the electret element 220, the JFET 230, the separator circuit 500 and the storage 590 (if present). The audio-high conductor 292 is coupled to the separator circuit 500, and in turn, the separator circuit 500 is coupled to the electret element 220 through the digital potentiometer 535 (if present) and the JFET 230.

During normal operation of the electret microphone 2000 in its intended role of electrically outputting an analog signal representing sounds detected by the electret element 220, the electret microphone 2000 is coupled via the audio-low conductor 291 and the audio-high conductor 292 to a receiving device (not shown) or to components of a device into which the electret microphone 2000 is incorporated (also not shown) that provides the electret microphone 2000 with a relatively low DC bias voltage (again, depicted as V1 in FIG. 1c) by which a voltage potential is provided to charge the conductive diaphragm and the conductive plate of the electret element 220 (to enable the creation of the aforementioned changing capacitance), and by which power is provided to the JFET 230 to enable its operation as a amplifier. As will be familiar to those skilled in the art, the audio-low conductor 291 and the audio-high conductor 292 are used together as a pair of audio signal conductors both to provide such a relatively low DC bias voltage to the electret microphone 2000, and to receive an analog audio signal from the electret microphone 2000 in the form of an AC signal component added to the relatively low DC bias voltage (i.e., these conductors are used in an analog interfacing mode).

However, at other times when either the acoustic driver 1000 or the electret microphone 2000 is not being operated such that one or the other is coupled via the audio-low conductor 191 or 291 and the audio-high conductor 192 or 292 to another device (not shown) to exchange analog signals conveying audio (i.e., these audio conductors are not being used in an analog interfacing mode), and instead, one or the other of the acoustic driver 1000 or the electret microphone 2000 is coupled via these audio conductors to exchange audio-related data (i.e., these audio conductors are used in a digital interfacing mode). This exchange of audio-related data is performed by using the audio-low conductor 191 or 291 and the audio-high conductor 192 or 292 together as a pair to form a 2-wire variety of digital serial bus. In being so used to implement a digital serial bus, the audio-high conductor 192 or 292 may be employed as a serial data conductor and the audio-low conductor 191 or 291 may be employed as the matching ground conductor. This use of these two audio signal conductors as a digital serial bus in a digital interfacing mode is accompanied with and is enabled by the provision of DC bias voltage across these two conductors that is substantially or at least measurably different from whatever DC bias voltage may be expected across these two conductors during the exchange of analog signals conveying audio in an analog interfacing mode. In FIG. 1c, the DC bias voltage depicted as being placed across these two conductors during such a digital interfacing mode is V2, and is depicted as being a higher than the DC bias voltage V1 expected to be placed across these conductors during such an analog interfacing mode (it should be noted that the choice of V2 being higher than V1 is only by way of example, and the reverse is also possible in other implementations).

In each of the acoustic driver 1000 and the electret microphone 2000, the separator circuit 500 determines whether the current mode is an analog interfacing mode or a digital interfacing mode by the magnitude of the DC bias voltage placed across the audio-low conductor 191 or 291, and the audio-high conductor 192 or 292 by an external device to which one or the other of the acoustic driver 1000 and the electret microphone 2000 is coupled via these two audio signal conductors. In the example depicted in FIG. 1c, where there is a relatively low DC bias voltage (possibly low enough that there is no DC bias voltage, at all—i.e., 0 volts), the separator circuit 500 simply allows the alternating current (AC) component of analog audio signals (the portion of analog audio signals that actually represents sounds) to pass through the separator circuit 500. In some embodiments, the separator circuit 500 may be implemented simply with a capacitor interposed between the audio-high conductor 192 or 292 and the conductor coupling the separator circuit 500 to the coil 120 or to the MOSFET 230, and with a Zener diode interposed between the audio-high conductor 192 or 292 and the storage 590; or alternatively, a comparator may be employed with a reference voltage source such as a Zener diode. The threshold voltage of such a Zener diode would be selected to define a threshold voltage to be imposed by the separator circuit 500 to distinguish between the relatively high and relative low DC bias voltages (i.e., V2 and V1) associated with the digital and analog interfacing modes, respectively.

In the case of the acoustic driver 1000, where the DC bias voltage V1 is present across the audio conductors 191 and 192 such that these audio conductors are employed in analog interfacing mode, an AC component representing audio is allowed to pass between the audio-high conductor 192 and another conductor coupling the separator circuit 500 to the coil 120, thereby providing a complete circuit between the audio-low conductor 191 and the audio-high conductor 192 through the separator circuit 500 and the coil 120 by which the aforedescribed process of transduction to acoustically output sounds takes place (i.e., the acoustic driver 1000 is operated in audio mode). However, where the DC bias voltage V2 is present such that these audio conductors are employed in digital interfacing mode, the separator circuit 500 ceases to pass AC signals through the coil 120, and instead, enables the storage 590 to be accessed to at least allow digitally-encoded data stored within storage locations of the storage 590 to be retrieved from the storage 590 and output by the acoustic driver 1000 via the audio-high conductor 192 from the storage 590. Further, where the storage 590 is based on a technology that enables storage locations within the storage 590 to be rewritten (possibly stored in storage locations that are first electrically erased), storage locations within the storage 590 may be written with digitally-encoded data input to the acoustic driver 1000 via these audio signal conductors to store new digitally-encoded data.

In the case of the electret microphone 2000, where the DC bias voltage V1 (a non-zero voltage that is lower than voltage V2) is present across the conductors 291 and 292 such that these audio conductors are employed in analog interfacing mode, an AC component representing audio is allowed to pass from amplified output of the JFET 230 (and possibly through the digital potentiometer 535) and to the audio-high conductor 292, thereby providing a complete circuit between the audio-low conductor 291 and the mic-high conductor 192 through the separator circuit 500. However, where the DC bias voltage V2 is present such that these audio conductors are employed in digital interfacing mode, the separator circuit 500 ceases to pass AC signals received from the JFET 230, and instead, enables one or both of the digital potentiometer 535 and the storage 590 to be accessed. Some embodiments of the electret microphone 2000 may incorporate the digital potentiometer 535, while others may incorporate the storage 590, and still others may incorporate both. Where both are incorporated, a protocol and/or device selection scheme (e.g., device addressing) may be employed to select one or the other for being accessed through operation of the mic-low conductor 291 and the mic-high conductor 292 as a digital serial bus.

The storage 590 may be any of a wide variety of types of storage device, but is preferably a solid-state electronic storage device that does not require an external supply of electric power to maintain data within it (i.e., what is commonly referred to as a "nonvolatile" storage device). Thus, the storage 590 may be based on any of a variety of nonvolatile solid-state data storage technologies, including and not limited to, electrically-erasable programmable read-only memory, FLASH, battery-back static random access memory (SRAM), etc. More specifically, in at least some embodiments, the storage 590 may be an EEPROM with a 1-Wire® digital serial bus interface (promulgated by and a registered trademark of Dallas Semiconductor, a division of Maxim Integrated Products of Sunnyvale, Calif.), and the separator circuit 500 may enable the audio-high conductor 192 to be operated as a digital serial bus that at least somewhat resembles a 1-Wire digital serial bus during a digital interfacing mode.

The storage 590 may store any of a variety of pieces of data concerning operating characteristics of the acoustic driver 1000 or the electret microphone 2000 derived from testing, perhaps by the manufacturer. For the acoustic driver 1000, such characteristics could include, but are not limited to, a range of frequencies able to be acoustically output, actual measured resistance of the coil 120, a measured variation in acoustic output across a specified range of frequencies, etc. For the electret microphone 2000, such characteristics could include, but are not limited to, average sensitivity, a range of frequencies of sounds able to be detected, an actual measured resistance, a measured variation in amplitude of analog signal output across a specified range of frequencies, etc. Alternatively and/or additionally for either, such data as a serial number, a date of manufacture and/or an identity of the manufacturer may be stored. A stored serial number may enable desired characteristics to be obtained from records of testing done by the manufacturer. Also alternatively and/or additionally, a history of repairs and/or refurbishing, installations in one or more devices, whether or not the acoustic driver 1000 or the electret microphone 2000 is a replacement part or an original part of a larger device, etc., may be stored, thereby enabling future decisions regarding repair or replacement to be made with knowledge of the past, especially if there are suspicions of a recurring failure that is difficult to verify.

Where the digital potentiometer 535 is present, it is a digitally controllable variable resistor in which the resistance it imposes on the coupling between the output of the JFET 230 and the separator circuit 500 is tunable (i.e., can be varied) with digital data received by the electret microphone 2000 during a digital interfacing mode that correlates to a chosen amount of resistance to which the digital potentiometer 535 is to be set. Through the digital potentiometer 535, the gain in the analog signal provided by the JFET 230 is able to be controlled such that the digital potentiometer 535 serves as a gain control component of the electret microphone 2000. Having such a gain control component may be deemed desirable where a specific sensitivity of the electret microphone 2000 for a specific range of frequencies is desired, and variances in the sensitivities of different ones of the electret microphone 2000 are being encountered as they are manufactured such that being able to tune the sensitivity with the digital potentiometer 535 allows a manufacturer to provide multiple ones of the electret microphone 2000 with a consistent sensitivity (perhaps a desired sensitivity that fits an ideal standard that the manufacturer wants to achieve with each one of those electret microphones). The exchange of digitally-encoded data across the digital serial bus formed with these two audio conductors may be employed to at least write digitally-encoded data representing a chosen amount of resistance to the digital potentiometer 535. Further, this same digital serial bus may also be employed to retrieve digitally-encoded data from the digital potentiometer 535 that represents the amount of resistance to which the digital potentiometer 535 is currently set, if the digital potentiometer 535 supports such retrieval of data. Still further, in some embodiments, the digital potentiometer 535 may incorporate one or more storage locations into which digitally-encoded data representing information other than a resistance setting for the digital potentiometer 535 may be stored. In such embodiments, this may obviate the need to incorporate the separate storage 590 to provide storage locations for storage of data representing characteristics of the electret microphone 2000.

Figure 2A:
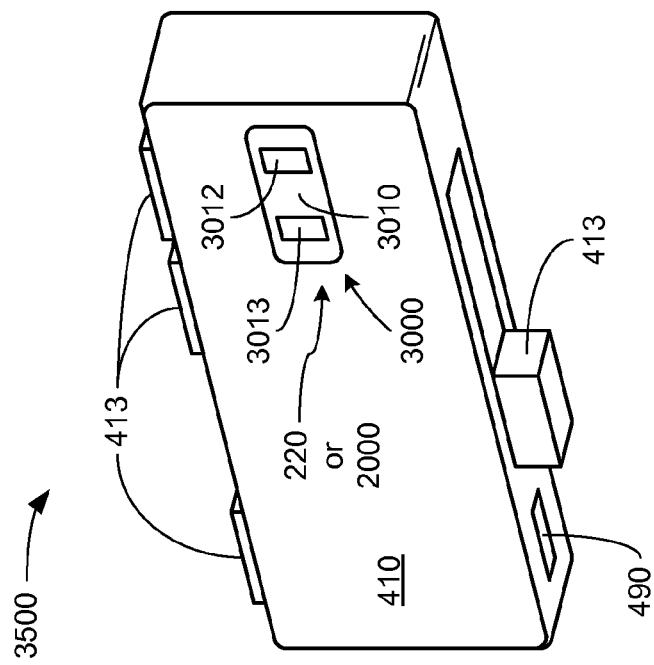

FIGS. 2a and 2b are perspective views of a two-way wireless communications headset 3500 (also known to be referred to as a "wireless earset"). The headset 3500 incorporates an earpiece 410 that carries an acoustic driver (either the acoustic driver 1000 or another acoustic driver incorporating the coil 120), a microphone assembly 3000, an ear coupling 411, and a set of manually-operable controls 413. The microphone assembly 3000 incorporates a microphone (either an electret microphone such as the electret microphone 2000, a microphone element such as the microphone element 220, or a dynamic microphone) mounted within a dual-ported casing 3010 having two curving ports 3012 and 3013 that each acoustically couple whatever microphone is mounted within the casing 3010 to the environment external to the earpiece 410. The ear coupling 411 engages an ear of a user in such a manner as to keep the headset 3500 in place adjacent that ear without the use of a headband 412. The set of manually-operable controls 413 likely (but not necessarily) include one or more of a power switch, a volume control, a mute control, a call answering control and a call initiating control.

Figure 3A:
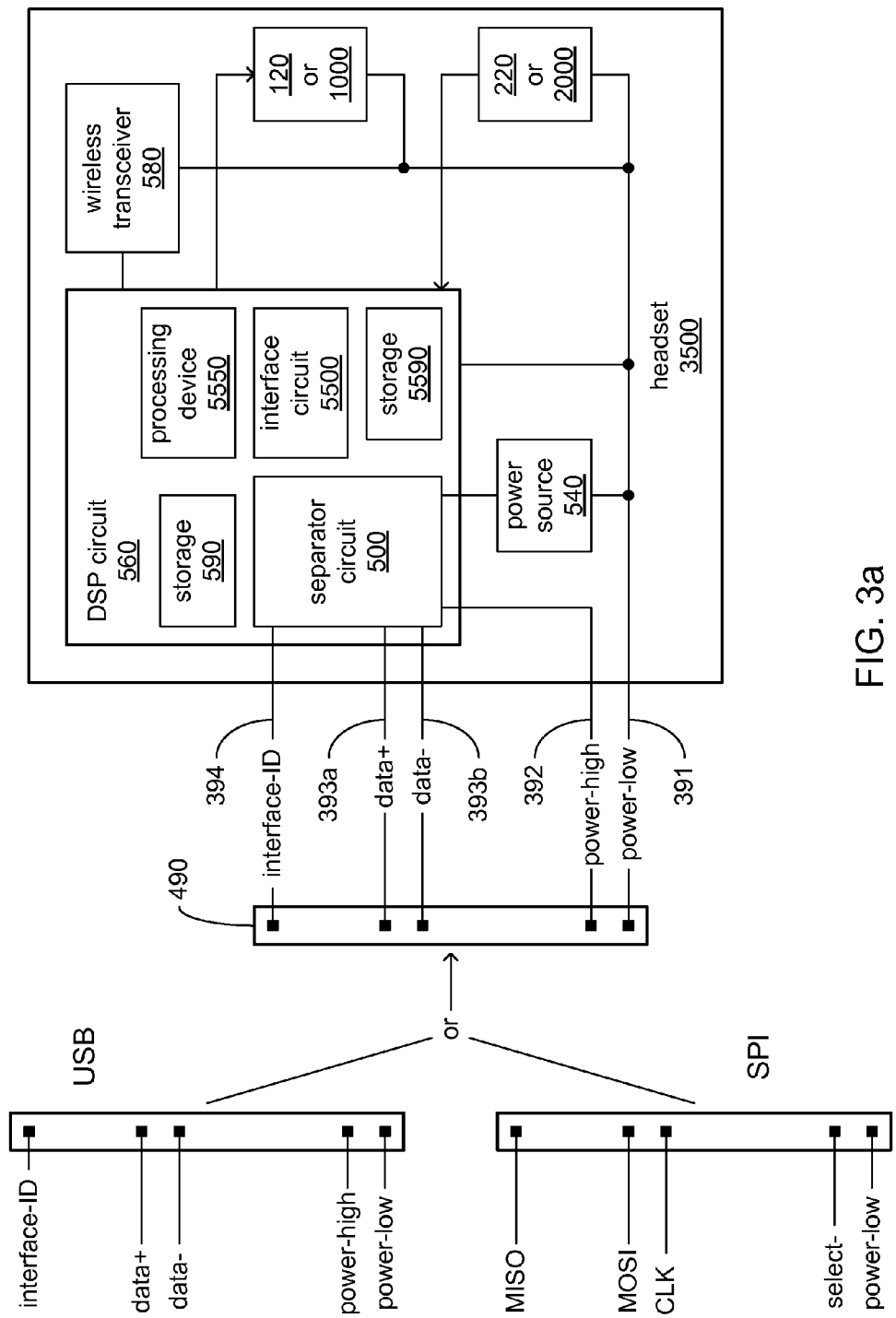
FIGS. 3a, 3b and 3c depict aspects of a possible electrical architecture of the headset of FIGS. 2a and 2b.

FIG. 3a is a block diagram of a possible electrical architecture of the headset 3500, including its flexibility to support the operation of a set of audio conductors in either an external digital interfacing mode or an internal digital interfacing mode. As depicted, where the headset 3500 employs this depicted architecture, the headset 3500 further incorporates a wireless transceiver 580, a DSP circuit 560, and perhaps a power source 540. In turn, the DSP circuit 560 incorporates a variant of the separator circuit 500, the storage 590, an interface circuit 5500, a processing device 5550, a storage 5590, and perhaps the storage 590. As depicted, the headset 3500 is able to be coupled to other devices via audio conductors 391, 392, 393a and 393b (and perhaps also 394) incorporated into the connector 490, with those audio conductors being employed in either an external digital interfacing mode or an internal digital interfacing mode.

In the external digital interfacing mode, these audio conductors are employed to convey signals having timings, voltages and/or other characteristics conforming to the specifications of one widely known and used digital serial bus. This one such digital serial bus may be selected due to its commonplace use in coupling various devices (including audio devices, such as the headset 3500) via relatively lengthy cables, which may be deemed advantageous for convenience of use by a user of the headset 3500, since such commonplace use is likely to provide a high likelihood that the user will be able to couple the headset 3500 to a wide assortment of other devices with relatively little difficulty. Thus, given their current commonplace use, such a digital serial bus may be, and is not limited to, a variant of Universal Serial Bus (USB) promulgated by the USB Implementers Forum, Inc. of Portland Oreg.; a variant of FireWire (IEEE-1394) promulgated by the Institute of Electrical and Electronics Engineers (IEEE) of Washington, D.C.; or a variant of Ethernet (IEEE-802.3) also promulgated by IEEE. Where USB is implemented on these audio conductors 391, 392, 393a, 393b and/or 394 during the external digital interfacing mode, the connector 490 may be a variant of a "mini-USB" or "micro-USB" connector. Where FireWire is the digital serial bus implemented on these audio conductors 391, 392, 393a, 393b and/or 394 during the external digital interfacing mode, the connector 490 may be a variant of the 4-pin "FireWire 800" connector; or a variant of either the 6-pin "FireWire 400" or 9-pin "FireWire 800" connectors, perhaps with less than all of the contacts populated. Where Ethernet is the digital serial bus implemented on these audio conductors 391, 392, 393a, 393b and/or 394 during the external digital interfacing mode, the connector 490 may be a variant of "RJ-11" or "RJ-45" connector, and a variant of Ethernet using only a single differential pair may be implemented that incorporates a variant of "power over Ethernet" (POE).

In the internal digital interfacing mode, these audio conductors are employed to convey signals having timings, voltages and/or other characteristics conforming to the specifications of another widely known and used digital serial bus. This other such digital serial bus may be selected due to its commonplace use in coupling various components (often integrated circuits, e.g., processing devices, storages, interface circuits, analog-to-digital converters, digital-to-analog converters, buffers, transceivers, etc.) within a device via conductors carried by conductive circuitboard traces (and or by relatively short cables within the cabinetry of a device), which may be deemed advantageous for use within an audio device such as the headset 3500. Thus, given their current commonplace use, such a digital serial bus may be, and is not limited to, a variant of Serial Peripheral Interface Bus (SPI Bus) promulgated by Motorola of Schaumburg, Ill.; or the Inter-IC Bus (I2C-Bus) promulgated by NXP of Eindhoven in the Netherlands. Regardless of what form of digital serial bus is implemented using the audio conductors 391, 392, 393a, 393b and/or 394 in the internal digital interfacing mode, the connector 490 is preferably (though not necessarily) selected to conform to the specifications of whatever digital serial bus is selected to be implemented in the external digital interfacing mode, as it is likely that a specification for whatever digital serial bus is implemented in the external digital interfacing mode will specify connector types and/or characteristics.

As depicted in FIG. 3a, this example architecture that may be employed in the headset 3500 is meant to support the audio conductors 391, 392, 393a, 393b and 394 being used to conform to the specifications of either USB in the external digital interfacing mode or SPI Bus in the internal digital interfacing mode. In keeping with the selection of USB for the external digital interfacing mode, the connector 490 is selected to conform to USB specifications for either a "mini-USB" or "micro-USB" receptacle, and preferably is selected to conform to the physical and electrical characteristics of one or the other of the "Micro-AB" receptacle or "Micro-B" receptacle. Accordingly, individual ones of the audio conductors 391, 392, 393a, 393b and 394 have been labeled in FIG. 3a with names related to their functions where these audio conductors are employed to support the Micro-USB variant of USB. Specifically, as depicted in FIG. 3a, when implementing USB, the audio conductor 392 becomes the power-high conductor conveying 5 VDC electric power; the audio conductors 393a and 393b become the data+ and data− conductors, respectively, for the bidirectional conveying of data; and the audio conductor 394 becomes the interface-ID conductor by which the insertion of a "type-A" or "type-B" plug into the connector 490 is indicated by being tied to either 5 VDC or 0 volts (ground). Further, when implementing SPI Bus, the audio conductor 392 becomes the select-conductor serving as a "chip select" or "slave select" by which a device coupled to the connector 490 indicates that it is selecting the headset 3500; the audio conductor 393a becomes the MOSI (master-out, slave-in) conductor by which data is serially transmitted to the headset 3500; the audio conductor 393b becomes the CLK (clock signal) conductor by which data is synchronously transferred as per the SPI Bus specification; and the audio conductor 394 becomes the MISO (master-in, slave-out) conductor by which the headset 3500 serially transmits data to whatever device is coupled to the connector 490. In either case, the audio conductor 391 serves as a ground conductor (i.e., "power-low") by which the voltage levels of other signals on the other audio conductors are referenced. As will be explained in greater detail, the variant of the separator circuit 500 employed in the architecture depicted in FIG. 3a monitors the voltage level driven onto one of these audio conductors by whatever device to which the headset 3500 is coupled via the connector 490 to distinguish between at least the internal digital interfacing mode and the external digital interfacing mode. It should again be noted that these specific selections of USB and SPI Bus, along with the Micro-AB or Micro-B USB receptacles, are set forth only as an example for enabling understanding, and should not be taken as limiting.

In addition to being able to be electrically coupled to another device via the connector 490 and via the audio conductors 391, 392, 393a, 393b and 394, the headset 3500 is able to be wirelessly coupled to another device via the wireless transceiver 580 forming a wireless link (e.g., a point-to-point wireless link) with a corresponding wireless transceiver of that other device. The wireless link formed by the headset 3500 with another device via the wireless transceiver 580 may conform to any of a number of possible widely known and used wireless communications specifications, including and not limited to, IEEE 802.11a, 802.11b or 802.11g promulgated by the IEEE; Bluetooth promulgated by the Bluetooth Special Interest Group of Bellevue, Wash.; or ZigBee promulgated by the ZigBee Alliance of San Ramon, Calif.

It is envisioned that, generally, but not necessarily, the audio conductors 391, 392, 393a, 393b and 394 will be employed in conveying audio-related data in the internal digital interfacing mode as the headset 3500 is assembled and tested by its manufacturer, and/or by service personnel engaging in maintenance or repair of the headset 3500. It is further envisioned that, generally, but not necessarily, the audio conductors 391, 392, 393a, 393b and 394 will be employed in conveying audio-related data and providing electric power for recharging the power source 540 in the external digital interfacing mode as the headset is put to normal use by a user. It is further envisioned that the wireless transceiver 580 will be employed in forming a wireless link between the headset 3500 and another device to convey audio-related data by at least a user during normal use, and perhaps also by its manufacturer and/or service personnel as part of testing, maintenance and/or repair.

In some embodiments, this separation of uses between the internal and external digital interfacing modes is envisioned as being partially dictated by the form of digital serial bus implemented (using the audio conductors 391, 392, 393a, 393b and 394) during the internal digital interfacing mode being selected to be the substantially the same as the digital serial bus employed in coupling various components within the headset 3500, including and not limited to, one or more of the separator circuit 500, the wireless transceiver 580, the interface circuit 5500, the processing device 5550, and the storage 5590. In other words, it is envisioned that use of the digital serial bus selected to be implemented in the internal digital interfacing mode will more tightly couple whatever device is coupled to the connector 490 to a digital serial bus employed in coupling one or more of these components within the headset 3500 such that relatively direct access to each of those components is provided to that device coupled to the connector 490. More specifically, it is envisioned that a device coupled to the headset 3500 via the connector 490 during the internal digital interfacing mode will be able to directly select (i.e., address) one or more components within the headset 3500 in order to read and/or write data storage locations and/or control registers of those one or more components. Such a tighter coupling, and the more direct access to individual components that it provides, is meant to facilitate direct programming and testing of individual components without involving the complexities of conversions of bus protocols or coordinating transfers of data through a bus-to-bus bridge device that may prevent needed direct monitoring and/or direct interaction with activity occurring between components on whatever digital serial bus is employed within the headset 3500 to couple components.

Alternatively, in other embodiments, the form of digital serial bus implemented (using the audio conductors 391, 392, 393a, 393b and 394) is selected to be a form of digital serial bus that is supported by a single component within the headset 3500 so as to enable direct access to that one component during the internal digital interfacing mode to perform tests on that one component, access audio-related data pertinent to that one component's operation, access audio-related data concerning settings for the headset 3500, or otherwise control or alter operation of the headset 3500 through that one component. For example, it may be that the internal digital interfacing mode is employed to access only the storage 590 to retrieve manufacturing history, repair history, a serial number, audio-related settings or other audio-related data concerning the headset 3500. By way of a different example, it may be that the internal digital interfacing mode is employed to access only the storage 5590 to enable updating or other changes to software that may be stored therein for being executed by the processing device 5550. In still another example, the internal digital interfacing mode may be employed to access only the processing device 5550 to either monitor or alter its operation, perhaps as it accesses and executes software stored within the storage 5590. In such embodiments where the internal digital interfacing mode is employed to gain access to only one of such components within the headset 3500, the form of digital serial bus implemented using the audio conductors 391, 392, 393a, 393b and/or 394 may be entirely different from whatever digital serial bus is employed to couple components within the headset 3500. Thus, for example, while SPI Bus may be implemented to on these audio conductors to enable direct access to the processing device 5550 through the connector 490, the processing device 5550 may be coupled to the storage 5590 and/or other components by an entirely different form of bus.

The form of digital serial bus implemented (using the audio conductors 391, 392, 393a, 393b and 394) during the external digital interfacing mode is envisioned as being a bus likely to have a considerably more complex protocol than whatever digital serial bus is implemented during the internal digital interfacing mode, and as a result, it is expected that whatever digital serial bus is implemented during the external digital interfacing mode will require interfacing circuitry of far greater complexity to convey data between it and one or more of the components within the headset 3500. Such complexities in protocol are expected to stem from the provision of various convenience features to enhance ease of use of the headset 3500 for a typical user. It is expected that such features would include automated device discovery routines, automated security key exchanges, automated device address assignments, automated triggering of the loading of device drivers, etc. Thus, it is expected that whatever digital serial bus is implemented via the audio conductors 391, 392, 393a, 393b and 394 during the external digital interfacing mode will entail the provision of a whole host of complex features that are deemed of value to a user of the headset 3500, but which are deemed unnecessary (and perhaps, also undesirable) to those engaged in testing, maintenance and/or repair of the headset 3500. This is in keeping with digital serial buses such as USB or Ethernet that incorporate various features to "foolproof" their operation to account for users of a product (such as the headset 3500) having less technical savvy than engineers or technicians who will likely prefer the comparative lack of complexity often associated with such digital serial buses as SPI Bus and I2C-Bus.

Figure 3B:
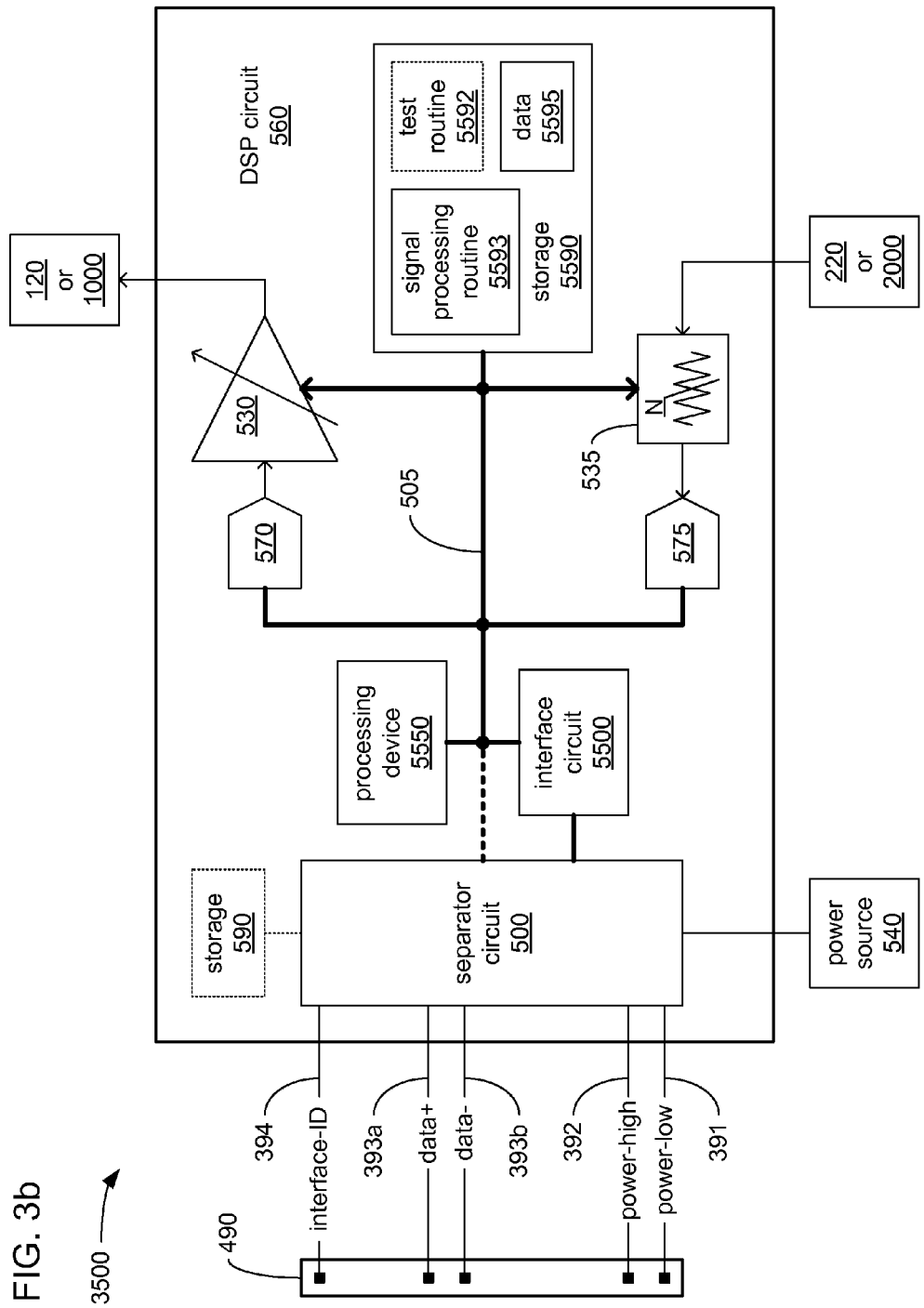

FIG. 3b is a block diagram providing more detail of the possible electrical architecture depicted in FIG. 3a, including the manner in which components of the DSP circuits 560 are coupled via an internal digital serial bus 505. As depicted, the DSP circuit 560 further incorporates an audio amplifier 530, a digital potentiometer 535, a digital-to-analog (D-to-A) converter 570, an analog-to-digital (A-to-D) converter 575, and the internal digital serial bus 505. The internal digital serial bus 505 couples processing device 5500 to the audio amplifier 530, the digital potentiometer 535, the D-to-A converter 570, the A-to-D converter 575, the interface circuit 5500 and the storage 5590. The interface circuit 5500 is also selectively coupled through the separator circuit 500 to one or more of the audio conductors 391, 392, 393a, 393b and 394 so as to provide a more direct coupling between the interface circuit 5500 and these audio conductors. As will be explained in greater detail, the internal digital serial bus 505 may also be coupled to the separator circuit 500 to enable the separator circuit 500 to selectively coupled the internal digital serial bus 505 to the audio conductors 391, 392, 393a, 393b and/or 394. Additionally and/or alternatively, the DSP circuit 560 may or may not incorporate the storage 590 coupled to the separator 500 so as to be selectively coupled through the separator circuit 500 to one or more of these audio conductors.

The interface circuit 5500 serves to bridge the internal digital serial bus 505 to the audio conductors 391, 392, 393a, 393b and/or 394 at times when these audio conductors are employed in implementing a digital serial bus of a different type from the internal digital serial bus 505. The interface circuit 5500 converts between the differing protocols, data transfer clock synchronizations, signal levels, sideband bus features, and/or various other differences between two different digital serial buses. As will be explained in greater detail, the separator circuit 500 couples the interface circuit 5500 to the audio conductors 391, 392, 393a, 393b and/or 394 at times when it is desired to have the interface circuit 5500 perform such conversion functions. Also, as will also be explained in greater detail, in some embodiments, where it is desired to be able to have more direct access to multiple components from a device coupled to the connector 490, the separator circuit 500 couples the internal digital serial bus 505 to these audio conductors at times when a digital serial bus that is more compatible with the internal digital serial bus 505 is implemented on these audio conductors; and in other embodiments, where the storage 590 is present and it is desired to be able to directly access the storage 590 from a device coupled to the connector 490, the separator circuit 500 couples the digital serial bus by which the storage 590 (if present) is coupled to the separator circuit 500 to these audio conductors at times when a digital serial bus that is more compatible with the type of digital serial bus supported by the storage 590 is implemented on these audio conductors.

The processing device 5500 may be any of a variety of types of processing device, including and not limited to a digital signal processor (DSP), a general purpose central processing unit (CPU), a microcontroller, a sequencer, a reduced instruction set computer (RISC) processor, etc. The storage 5590 may be based on any of a variety of solid state or other storage technology employable to both store sequences of instructions (i.e., software) and/or data, and to enable the processing device 5500 to retrieve the same. As depicted, the storage 5590 stores at least a signal processing routine 5593 and a data 5595, and may also store a test routine 5592. During operation of the headset 3500, the processing device 5550 accesses the storage 5590 to retrieve and execute sequences of instructions from one or both of the signal processing routine 5593 and the test routine 5592 (if present). Execution of sequences of instructions from one or both of these routines causes the processing device 5550 to operate the D-to-A converter 570 and the audio amplifier 530 to cause sounds to be acoustically output by an acoustic driver (i.e., either the acoustic driver 1000 or another acoustic driver incorporating the coil 120), to operate the A-to-D converter 575 and the digital potentiometer 535 to retrieve digitally-encoded data representing sounds detected by a microphone (e.g., the electret microphone 2000 or the electret element 220), and to operate the wireless transceiver 580 to exchange audio-related data wirelessly between the headset 3500 and a corresponding transceiver of another device.

In being a headset with the ability to form a wireless link with another device, it is envisioned that the wireless headset 3500 is to be employed by a user with a cellular telephone, a walkie-talkie, a computer system or other device capable of wireless communications for the purposes of enabling a user to engage in two-communications (e.g., a telephone call, radio communications, voice-over-IP telephony, etc.). This is envisioned as being much of what the signal processing routine 5593 will cause the processing device 5550 to operate others of the components to support and carry out during normal operation of the headset 3500. In being a headset, it is also envisioned that the power source 540 is a portable power source that must be recharged or otherwise provided with power from a source external to the headset 3500. In other words, it is envisioned that the power source 540 is a form of battery, high density capacitor or other energy storage device.

The separator circuit 500 monitors the voltage level of the audio conductor 392 relative to the audio conductor 391 to distinguish at least between the internal digital interfacing mode and the external digital interfacing mode. In keeping with this exemplary architecture depicted in FIGS. 3a and 3b, in which USB has been selected to be implemented during the external interfacing mode, the audio conductor 392 has been labeled in both FIGS. 3a and 3b as being "power-high" in keeping with its use in USB as the conductor on which 5 VDC is supplied to the headset 3500, and the audio conductor 391 has been labeled as being "power-low" in keeping with its use in USB as the ground return conductor against which at least the supplied 5 VDC is referenced for voltage measurements. Where the separator circuit 500 detects approximately 5 VDC being provided to the connector 490 from a source external to the headset 3500, the separator circuit 500 operates the audio conductors 391, 392, 393a, 393b and 394 in the external digital interfacing mode, in which case, the separator circuit 500 causes a USB interface to be implemented on these audio conductors based on a presumption that the presence of 5 VDC on the audio conductor 392 indicates that a device has been coupled to the connector 490 that is interacting with the headset 3500 as a USB device.

However, where the separator circuit 500 detects a low voltage being provided on the audio conductor 392 as referenced to the audio conductor 391 (such as a zero voltage as would occur where the audio conductor 392 is coupled, perhaps "grounded," to the same voltage level as the audio conductor 391), the separator circuit 500 operates the audio conductors 391, 392, 393a, 393b and 394 in the internal digital interfacing mode, in which case, the separator circuit 500 causes an SPI Bus interface to be implemented on these audio conductors based on a presumption that the presence of 0 volts on the audio conductor 392 indicates that a device has been coupled to the connector 490 that is interacting with the headset 3500 as a device having a SPI Bus interface. This is based on the audio conductor 392 serving as the "select-" used to select a device (by driving "select-" with approximately a 0 volt level when active to select a device, i.e., driving to ground) for being accessed in the SPI Bus protocol during the internal digital interfacing mode, which is in keeping with this exemplary architecture in which SPI Bus has been selected to be implemented during the internal digital interfacing mode. Thus, more simply, the presence of 5 VDC or 0 volts on the audio conductor 392 (relative to the audio conductor 391) is employed by the separator circuit 500 as an indication of whether to operate these audio conductors in the external digital interfacing mode in which USB is implemented or to operate these audio conductors in the internal digital interfacing mode in which SPI Bus is implemented, respectively.

The selection of the audio conductor 392 as the conductor to be monitored to distinguish between the internal and external digital interfacing modes is based on the USB specification actually specifying the voltage, amperage (current) and other characteristics of DC power that is to be provided by one USB device to another, as well as specifying the characteristics of the particular contact on USB connectors through which it is to be supplied. As a result, where a device is coupled to the headset 3500 via the connector 490 and operates the audio conductors in accordance with USB specifications, that device can be reasonably relied upon to provide 5 VDC on the audio conductor 392 with more than sufficient amperage to serve as a reliable input. Specifying the provision of DC power to such a degree is common among digital serial buses that are frequently employed to externally couple devices (such as audio devices, e.g., the headset 3500), as it is commonly expected that one device with access to a relatively constantly available and higher capacity power supply (e.g., an AC main power supply provided as a utility to a house or other structure) will need to provide electric power to recharge a portable power source of another device (e.g., the power source 540, in the case of the headset 3500). In contrast, it is common among digital serial buses that are meant to be employed internally within a single device (such as an audio device, e.g., the headset 3500) to have specifications that do not specify the provision of power as it is expected that all of the components coupled to such an internal digital serial bus will be provided with electric power by a common power supply incorporated into that single device. This is also in keeping with the specifications for such internal digital serial buses also not commonly specifying connectors as it is often intended that such internal digital serial buses will most likely be entirely carried in most instances by the conductive traces of a single circuitboard. This affords the opportunity to select which signals of the digital serial bus implemented during the internal digital interfacing mode will share which ones of the audio conductors 391, 392, 393a, 393b and 394 with each of the signals of the digital serial bus implemented during the external digital interfacing mode. Thus, it is deemed advantageous to cause the conductor employed to supply electric power during the external digital interfacing mode to share a signal of the digital serial bus implemented during the internal digital interfacing mode that can be relied upon to have a voltage level (relative to a ground, such as the "power-low" audio conductor 391) that is different from the voltage level at which electric power is provided during the external digital interfacing mode.

Where the headset 3500 has been coupled via the connector 490 to another device that operates the headset 3500 as a USB device, the separator circuit 500 detects the 5 VDC placed on the audio conductor 392 (and relative to the ground voltage level of the audio conductor 391). In response, the separator circuit 500 couples the interface circuit 5500 to the audio conductors 391, 392, 393a, 393b and 394 and/or signals the interface circuit 5500 to couple itself to these audio conductors (e.g., signals the interface circuit 5500 to cease tri-stating its connections to one or more of these audio conductors) to enable interaction between the headset 3500 and that other device via USB through the interface circuit 5500. Thus, these audio conductors are being operated in the external digital interfacing mode in which USB is implemented. The interface circuit 5500 is made up of logic that enables the processing device 5550 to more easily support aspects of the more complex protocol and/or automated features of such a digital serial bus as USB, and thereby, more easily exchange audio-related data with whatever other device is coupled to the headset 3500 via USB through the connector 490. Within the DSP circuit 560, the internal digital serial bus 505 through which the processing device 5550 is coupled to and operates the interface circuit 5500 is an implementation of a simpler digital serial bus of a variety commonly employed to couple such components, e.g., SPI Bus or I2C-Bus. Thus, the processing device 5550 operates the interface circuit 5500 to exchange data present in transfers on the internal digital serial bus 505 with whatever other device is coupled to the headset 3500 via USB. Further, in embodiments in which the power source 540 is a power source requiring recharging (i.e., is a power source in which electrical energy is stored for later use by the headset 3500), the separator circuit 500 also responds to the presence of 5 VDC placed on the audio conductor 392 by employing that 5 VDC to recharge the power source 540.

With the headset 3500 coupled to another device via the connector 490, and with that other device interacting with the headset 3500 as a USB device, and with the separator circuit 500 enabling USB signaling as just described, a user may simply use the 5 VDC provided by that other device to recharge the power source 540 in preparation for future use of the headset 3500 and/or the user may cause the exchange of audio-related data via USB-compliant signaling. Given that the headset 3500 is a wireless headset employed in two-way communications (as has been described), such audio-related data may include settings for one or more of the manually-operable controls 413 (e.g., a default volume setting) preferred by the user, audio equalization settings preferred by the user, telephone numbers and/or security codes to enable speed dialing and/or access to a private wireless network, etc. Execution of a sequence of instructions of the signal processing routine 5593 causes the processing device 5550 to operate the interface circuit 5500 to monitor and operate the audio conductors 391, 392, 393a, 393b and/or 394 so as to cooperate with that other device coupled to the connector 490 to exchange audio-related data via USB-compliant signaling. Execution of a sequence of instructions of the signal processing routine 5593 may further cause the processing device 5550 to employ such audio-related data indicating such preferences in signal processing algorithms that modify digital data (such as the data 5595) representing transmitted sounds, received sounds, sounds to be acoustically output and/or acoustically detected sounds as the user has specified.

Where the headset 3500 has been coupled via the connector 490 to another device that operates the headset 3500 as a SPI Bus device, the separator circuit 500 detects the audio conductor 392 having approximately a 0 volt level, either as a result of being driven low with the output of an integrated circuit, or as a result of being coupled to the audio conductor 391 (i.e., as a result of being "grounded"). In response, the separator circuit 500 ceases any coupling of the interface circuit 5500 to the audio conductors 391, 392, 393a, 393b and 394 and/or signals the interface circuit 5500 to uncouple itself to these audio conductors (e.g., signals the interface circuit 5500 to tri-state its connections to one or more of these audio conductors) to prevent the interface circuit 5500 from engaging in USB-compliant signaling on these audio conductors, thereby allowing signaling compliant with SPI Bus to take place. Thus, these audio conductors are being operated in the internal digital interfacing mode in which SPI Bus is implemented. As previously discussed, different ones of the components of the headset 3500 are caused to engage in exchanges of audio-related data via these audio conductors implementing SPI Bus in different embodiments.

Again, in one embodiment, the internal digital interfacing mode is employed to enable that other device coupled to the connector 490 to access a single component of the headset 3500 to exchange audio-related data. As previously discussed, that single component may be the storage 590 (if present). In this case, the storage 590 preferably incorporates its own SPI Bus interface by which the storage 590 may be selectively coupled by the separator circuit 500 to the audio conductors 391, 392, 393a, 393b and/or 394 to thereby enable exchanges of such data between the storage 590 and that other device. Alternatively, that single component may be the processing device 5550, the storage 5590, or yet another component.

Alternatively, again, in another embodiment, the internal digital interfacing mode is employed to enable that other device coupled to the connector 490 to be coupled to the internal digital serial bus 505 to access one or more of the components coupled to the internal digital serial bus 505 to exchange audio-related data. In this other embodiment, the internal digital serial bus 505 is an implementation of SPI Bus where, normally, the processing device 5550 likely normally acts in the role of the master on the internal digital serial bus 505, and all other devices coupled thereto likely normally act as slaves. The separator circuit 500 may employ bidirectional solid-state switches or other relatively simple buffering devices to selectively couple the internal digital serial bus 505 to these audio conductors during the internal digital interfacing mode, effectively coupling that other device coupled to the connector 490 directly to the internal digital serial bus 505. However, in coupling the internal digital serial bus 505 to that other device, it is presumed that the processing device 5550 would be caused to cease to occupy the role of master, and that other device coupled to the connector 490 would assume the master role so as to be able to directly initiate accesses to device coupled to the internal digital serial bus 505. Given that in the architecture depicted in FIGS. 3a and 3b there are only enough of the audio conductors to support a single SPI-compliant select—(i.e., a single active-low slave selection signal), while there are multiple components coupled to the internal digital serial bus 505, the separator circuit 500 may incorporate logic needed to receive address cycles (or other SPI Bus transactions by which addresses or device selections may be conveyed), decode those cycles, and to drive individual "select-" conductors coupling the separator circuit 500 to one or more of the components coupled to the internal digital serial bus 505 to enable those components to be individually selected by that other device coupled to the connector 490.

With the headset 3500 coupled to another device via the connector 490, and with that other device interacting with the headset 3500 as a SPI Bus device, and with the separator circuit 500 enabling SPI Bus signaling as just described in one or the other of the two above embodiments, personnel engaged in testing, maintaining or repairing the headset 3500 may cause the exchange of audio-related data via signaling compliant with SPI Bus to test a component of the headset 3500, to access stored related to audio functionality, to manipulate or upgrade a stored routine, etc. In embodiments in which the internal digital interfacing mode is employed to provide access to only the storage 590, serial numbers, repair history, software version levels, and/or other data related to audio function of the headset 3500 may be retrieved or written. In embodiments in which only the storage 5590 is to be so accessed, one or both of the test routine 5592 or the signal processing routine 5593 may be altered, and/or the processing device 5550 may be caused to commence a test through the writing of a data value to a specific memory location within the storage 5590. In embodiments in which only the processing device 5550 is accessed, the processing device 5550 may be directly monitored as it executes a sequence of instructions of the test routine 5592 to carry out a test of either the processing device 5550, itself, in manipulating data representing sounds, or to carry out a test of the D-to-A converter 570, the A-to-D converter 575, the audio amplifier 530 and/or the digital potentiometer 535 manipulating signals and/or data representing sounds.

Figure 3C:
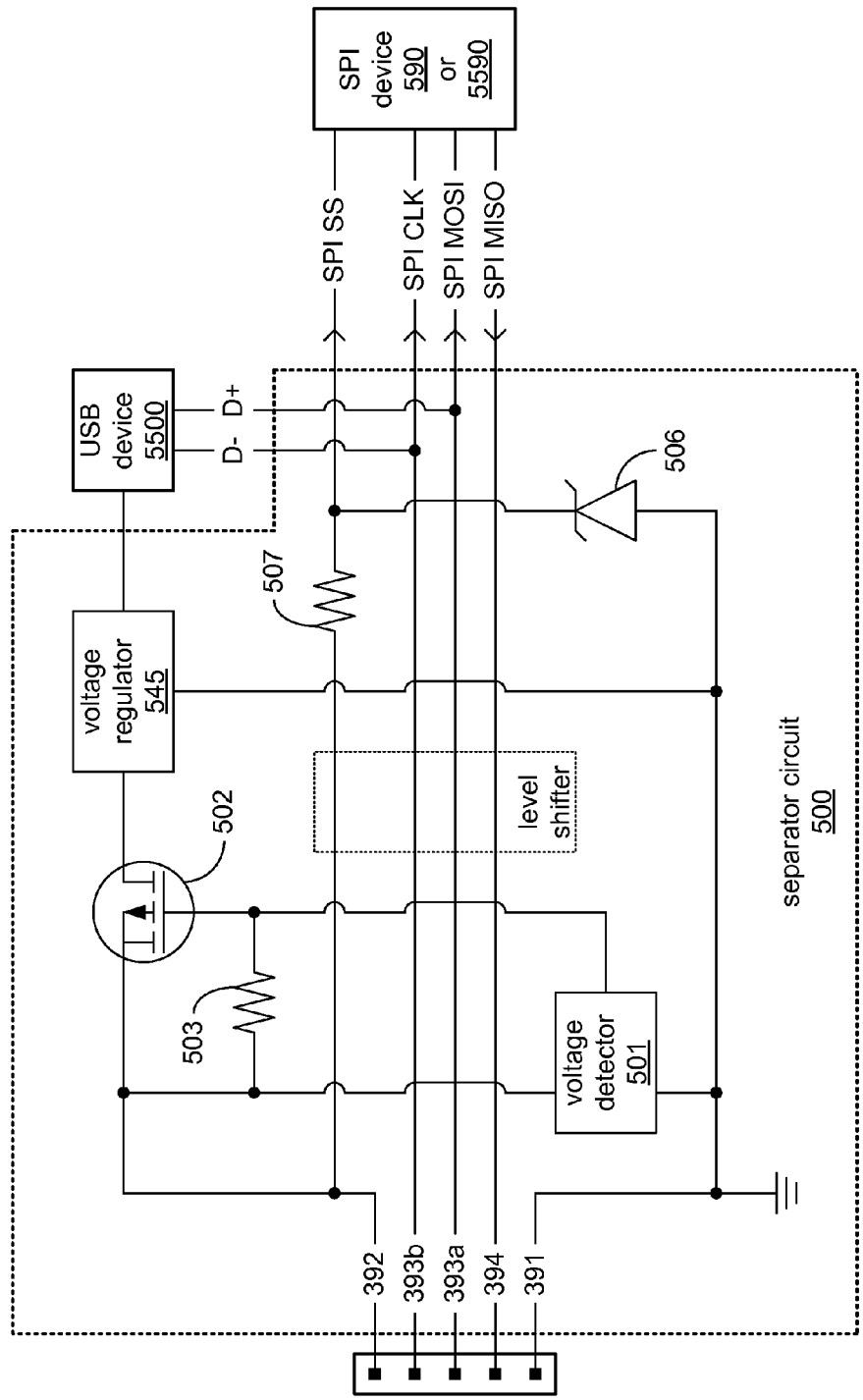

FIG. 3c is a schematic-level block diagram of an embodiment of the possible electrical architecture of FIG. 3a in which the internal digital interfacing mode entails the implementation of SPI Bus on the audio conductors 391, 392, 393a, 393b and 394 to enable access to a device coupled to the connector 490 to access a single component of the headset 3500. More specifically, FIG. 3c depicts a possible electrical architecture of the separator circuit 500 where the separator circuit 500 selectively provides access to the storage 590 (if present) or the storage 5590 via SPI Bus during the internal digital interfacing mode, and otherwise, allows access to the interface circuit 5500 during the external digital interfacing mode.

A voltage detector 501 compares the voltage level of the audio conductor 392 (referenced to the audio conductor 391) to an internal predefined reference voltage (e.g., 4.2 VDC). Where the voltage on the audio conductor 392 is above the reference voltage, as in the case of 5 VDC being supplied on the audio conductor 392 as per USB specifications, then the voltage detector 501 pulls the gate of a MOSFET 502 low to enable the audio conductor 392 to be coupled through the MOSFET 502 to a voltage regulator 545, thus enabling the power source 540 to be recharged and an active-high USB enable signal to be conveyed to the interface circuit 5500. However, where the voltage on the audio conductor 392 is below the reference voltage, as in the case of 0 volts being supplied on the audio conductor 392 to select the headset 3500 with an active-low "select-" signal as per SPI Bus specifications, then the gate of the MOSFET 502 is pulled low enough relative to the conductor 392 to place the MOSFET 502 in a non-conductive state, thus disconnecting the audio conductor 392 from the voltage regulator 545 and providing a low signal to the interface circuit 5500 to disable its USB interfacing.

Where the single component to be made accessible during the internal digital interfacing mode (i.e., the storage 590 or the storage 5590) has an input to receive the SPI Bus "select-" signal that is not capable of withstanding the 5 VDC power input of USB during the external digital interfacing mode, a combination of a zener diode 506 and a resistor 507 may be provided, as depicted, to limit the maximum voltage level received by that input. The fact that the audio conductor 392 is provided with 5 VDC during the external digital interfacing mode as per USB specifications serves as a disable signal to the single component that causes the single component to disable its SPI interface. In this way, only one or the other of the interface circuit 5500 or the single component (i.e., the storage 590 or the storage 5590) is enabled to electrically interact with whatever device is coupled to the connector 490, thus preventing a collision between different digital serial buses. Alternatively, the combination of the Zener diode 506 and the resistor 507 may be replaced with a set of level-shifting buffers (i.e., a level-shifter IC) interposed between both the integrated circuit 5500 and whichever of the storages 590 or 5590 is present, and all of the conductors 392, 393a, 393b and 394 (as depicted in dotted line form).

It should be noted that although considerable discussion has been given to monitoring the voltage level of the audio conductor 392 to distinguish between an internal digital interfacing mode and an external digital interfacing mode, a variant of one of the depicted forms of the separator circuit 500 may be capable of distinguishing between more than merely two voltage levels (e.g., perhaps additionally monitoring for a voltage level between 0 and 5 V, or perhaps above 5 V) so as to be able to distinguish both the internal and external digital interfacing modes from a third digital interfacing mode or an analog interfacing mode. It is envisioned as possible that one of the storages 590 or 5590, or perhaps the processing device 5550 are able to accommodate being communicated with using more than one form of digital serial bus, and that the separator circuit 500 may signal one or more of these components concerning which of the possible forms of digital serial bus is being employed to aid one or more of these components in being able to communicate via whatever form of digital serial bus is employed.

Other implementations are within the scope of the following claims and other claims to which the applicant may be entitled.

The invention claimed is:

1. A headset comprising:
   an acoustic driver;
   an interface circuit;
   a storage;
   a connector and a plurality of audio signal conductors to enable coupling of the headset to a device;
   a separator circuit coupled to two audio signal conductors of the plurality of audio signal conductors and to the interface circuit, and structured to:
   monitor a voltage placed across the two audio signal conductors by the device to distinguish between operation of the plurality of audio signal conductors in a first digital interfacing mode and a second digital interfacing mode by the device;
   enable access to the interface circuit by the device in response to operation of the plurality of audio conductors in the first digital interfacing mode to allow an exchange of data representing audio to be acoustically output by the acoustic driver; and
   enable access to the storage by the device in response to operation of the plurality of audio conductors in the second digital interfacing mode to allow the device to retrieve data stored within the storage.

2. The headset of claim 1, further comprising a processing device, wherein enabling access to the storage by the device comprises the separator circuit coupling the plurality of audio conductors to a plurality of conductors of an internal digital serial bus of the headset, wherein the internal digital serial bus couples the storage to the processing device.

3. A method comprising:
   within a headset, monitoring a voltage placed across two audio signal conductors of a plurality of audio signal conductors of a connector of the headset that enables a device to be coupled to the headset through the plurality of audio signal conductors to distinguish between operation of the plurality of audio signal conductors in a first digital interfacing mode and a second digital interfacing mode by the device;
   enabling access to an interface circuit of the headset by the device in response to operation of the plurality of audio conductors in the first digital interfacing mode to allow an exchange of data representing audio to be acoustically output by an acoustic driver of the headset; and
   enabling access to a storage of the headset by the device in response to operation of the plurality of audio conductors in the second digital interfacing mode to allow the device to retrieve data stored within the storage.

4. The method of claim 3, wherein enabling access to the storage by the device comprises coupling the plurality of audio conductors to a plurality of conductors of an internal digital serial bus of the headset, wherein the internal digital serial bus couples the storage to a processing device of the headset.

* * * * *